United States Patent [19]

Ihle

[11] Patent Number: 4,474,523

[45] Date of Patent: Oct. 2, 1984

[54] UNLOADING MEANS FOR BULK MATERIAL

[75] Inventor: Knut Ihle, Oslo, Norway

[73] Assignee: Norsk Hydro a.s., Oslo, Norway

[21] Appl. No.: 414,245

[22] PCT Filed: Jan. 4, 1982

[86] PCT No.: PCT/NO82/00001

§ 371 Date: Aug. 27, 1982

§ 102(e) Date: Aug. 27, 1982

[87] PCT Pub. No.: WO82/02367

PCT Pub. Date: Jul. 22, 1982

[30] Foreign Application Priority Data

Jan. 5, 1981 [NO] Norway .................. 810017

[51] Int. Cl.³ .......................... B65G 65/38
[52] U.S. Cl. .................... 414/144; 414/145; 414/313
[58] Field of Search ............ 414/139, 140, 143, 144, 414/145, 293, 295, 300, 313, 314, 315, 316, 317, 319, 320, 321; 198/511, 519, 520

[56] References Cited

U.S. PATENT DOCUMENTS 2,511,246 6/1950 Chamberlin .................. 406/39 X
2,649,215 8/1953 Dickson ...................... 414/317 X
4,165,202 8/1979 Haahjen ...................... 414/145 X

FOREIGN PATENT DOCUMENTS 2311900 9/1973 Fed. Rep. of Germany ...... 414/145

Primary Examiner—Leslie J. Paperner
Attorney, Agent, or Firm—Wenderoth, Lind & Ponack

[57] ABSTRACT

An unloading system for bulk material in cargo and storage rooms includes at least one scraper conveyor which is movable vertically and which attacks the bulk material from above and moves it in the horizontal direction against an elevator which transports the bulk material out of the room. Known systems of this type employ single scraper conveyors mounted on and supported by elongated guide beams crossing the room and which may be lowered by means of wires or chains. According to the invention, an integrated, dual acting scraper conveyor unit includes a main scraper member mounted opposite one of the sidewalls of the room, and a transverse member horizontally movable backwards and forwards on the main scraper member. Thus the total ground area of the room is covered. The use of downhanging wires or chains is eliminated by making the conveyor unit vertically movable, using sets of wheels moving along vertical rails mounted on the walls of the room.

6 Claims, 3 Drawing Figures

UNLOADING MEANS FOR BULK MATERIAL

BACKGROUND OF THE INVENTION

This invention relates to unloading and emptying means for bulk material in store houses and ship cargo holds. By bulk material is meant granular material with a capacity to slide and of different origin and particle size, such as grain, salt, fertilizers and the like.

There is known equipment for this purpose using scraper conveyors attacking the bulk material from above and moving it in the longitudinal direction of the room or hull. Due to the fact that the width of attack will be limited to the width of the individual scrapers, it will also be necessary to move the scraper conveyor transverse to the work direction, i.e. back and forth in the transverse direction of the room so that the total surface area of the store room will be covered. Furthermore, it will be necessary to be able to move the scraper conveyor vertically, so that it can be lowered at the same rate as the surface of the bulk material, as this is sinking due to the unloading. Scraper conveyors of this type are generally known, for instance from French Pat. No. 1,343,751.

As a result of the work of the scraper conveyor the bulk material will be moved in the longitudinal direction of the room and collects near one of the walls of the room, from where it can be transported out of the room by suitable elevator means which extend to the bottom of the floor.

When the elevator means is in the form of a stationary elevator, for instance a bucket elevator driven by endless chains, with the buckets mounted on the chains, there must also be provided means for transverse transportation of the bulk material, i.e. in a direction crossing the longitudinal direction, to the stationary elevator means.

Such transverse transportation may also conveniently be provided by means of a scraper conveyor, which either can be mounted near or at the bottom floor or on the surface of the bulk material. In the last mentioned case this transverse scraper conveyor must also be able to move in the vertical direction to progress together with the surface of the bulk material when it is gradually decreasing or sinking down during unloading.

Equipment of the last mentioned type is known and described in German Specification DOS No. 2,800,226, published July 18, 1978, but at that time not taken into practical use. Equipment of the first mentioned type is, however, also known, and since 1973 has been in practical use for transport of fertilizers in bulk ships. The solution using a scraper conveyor moving near the bottom of the cargo hold was chosen because one wished to use the transverse conveyor in combination with the lifting gear of the elevator, a bucket elevator which was extended completely down to the bottom of the hull, and thereby obtain a simpler and less costly construction. The choice between surface scraping or scraping at the bottom will also to a certain extent depend on the type of bulk material which is to be transported and how easily it slides.

The known unloading gear of this type utilizes scraper conveyors mounted on elongated guide beams which partly or completely cross the cargo hold. Furthermore, these beams are suspended in and mounted to be vertically movable by means of wires or chains hanging freely down from the roof or ceiling. The transmission of electrical current to the drive means situated on the scraper conveyors must also be done with long movable cables. This requires much space and causes great problems, not only for the unloading functions, but also when the hull must be loaded again with bulk material.

SUMMARY OF THE INVENTION

The main object of the present invention is to eliminate these drawbacks and to provide a new and improved unloading equipment. According to the invention, this object is obtained by using a specially designed conveyor unit including integrated scraper members which are vertically supported against one or more of the walls of the room and which take care of all scraping and transport functions necessary to bring the bulk material into the elevator means.

This integrated conveyor unit includes one main scraper member which is stationary in the transverse direction and which is mounted for vertical movement by means of wheel sets or the like running along rails mounted against the wall of the room, and one transverse scraper member connected to the main member and horizontally movable back and forth therealong. The transverse member thus will be vertically movable together with the main member, while it simultaneously is movable back and forth horizontally. The delivery end of the main scraper member cooperates with the elevator means transporting the bulk material out of the room. Due to this improved construction, the unloading gear will not obstruct the space above the hull when it is not used for unloading. Neither will there be any interference caused by beams hanging freely by chains or cables. Additionally, the equipment can easily be dismantled and brought ashore for replacement and repair and will not prevent the normal loading operation with subsequent delays of a ship at the quay-side. The equipment will also allow the use of the hull of the ship for other cargo than bulk material, such as containers and pallet goods, because it will be easy to dismount, take out and store on shore for shorter or longer time intervals when necessary.

BRIEF DESCRIPTION OF THE DRAWINGS

Additional advantages and especially important features of the invention will be apparent from the following detailed description with accompanying drawings, where.

DETAILED DESCRIPTION OF THE INVENTION

Figure 1:
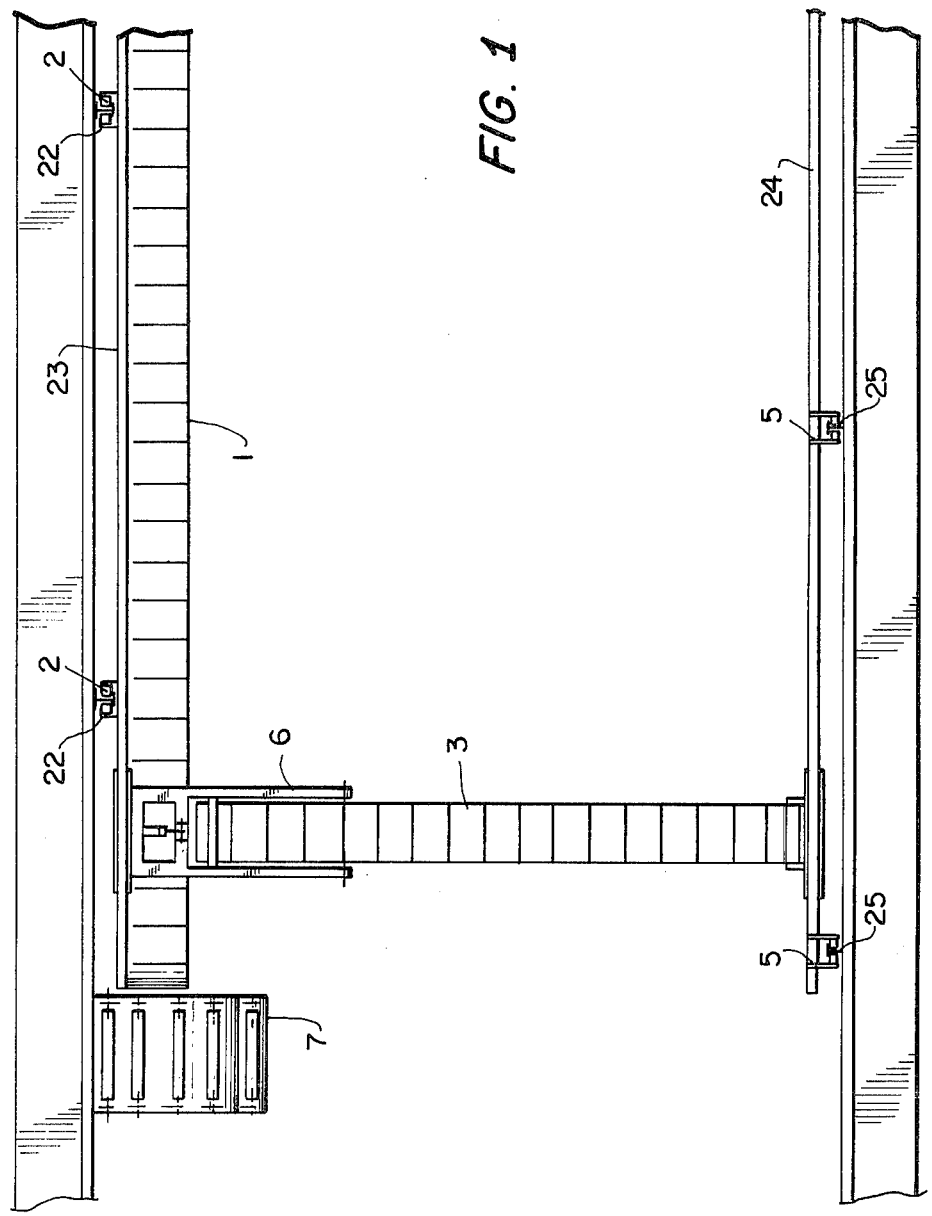
FIG. 1 is a view of a cargo hull in a ship seen from above with the unloading gear installed.
Figure 2:
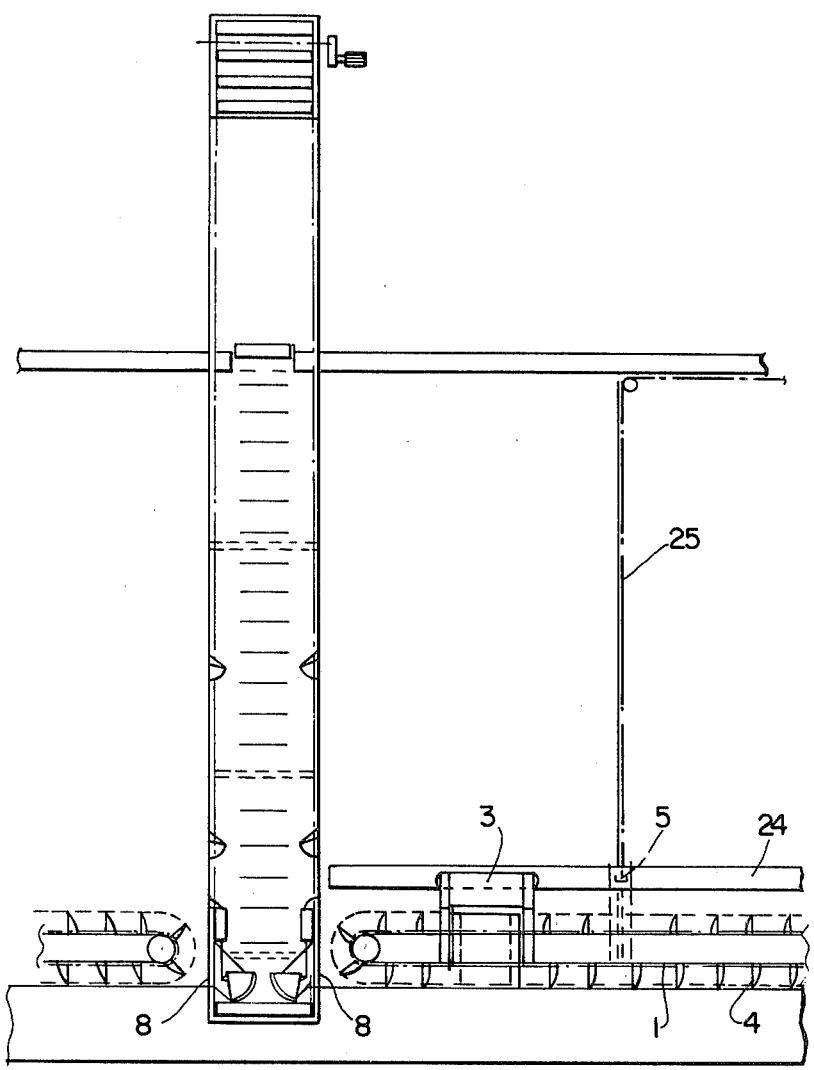
FIG. 2 is a vertical sectional view in the longitudinal direction of the ship with the scraper conveyor unit in lowered position.

The integrated scraper conveyor consists of a main member 1 and a back and forth movable, transverse member 3. The individual scraper elements are designed as bucket-formed scrapers or the like 4 which are fastened to endless chains driven by means of independent driving means, for instance an electric motor (not shown in the drawings).

The main member 1 is vertically movable by means of two or more sets of wheels 2 running along suitable rails 22 mounted against the vertical walls of the room (FIG.

1). The transverse member 3 is connected to the main member 1 by means of a fork 6 movably supported on a longitudinal guide 23 in the form of one or more rails. The distance between the main scraper member and the delivery end of the transverse member must be kept small and be kept constant or permanent. This is made simple due to the integration of the two members into a construction which functions as one entity. The height or vertical distance between the two scraper members can be individually regulated by means of the fork 6. The transverse member 3 will thus be vertically movable together with the main member 1.

To additionally support the back and forth movable, transverse member 3, the outer end thereof may be supported against a longitudinal horizontal guide rail 24. This guide is provided with two or more sets of wheels 5 which are movable on vertical auxiliary rails 25 mounted against one of the vertical walls. The main member, and eventually also the transverse member, are connected to a common wire or cord transmission system to raise or to lower the whole conveyor gear.

The unloading gear will thus become independent of movable or fixed beams or girdlers crossing the whole or part of the cargo hull or store house. The scraper conveyor unit will normally attack the bulk material from the surface. To allow for use also with the scrapers in partly or wholly covered position, they may be equipped with covers or the like on the top and at the sides. The working of the scraper system may be established by direct drive connection, or by means of appropriate transmission elements from the driving means. These details are, however, not shown on the drawings.

Figure 3:
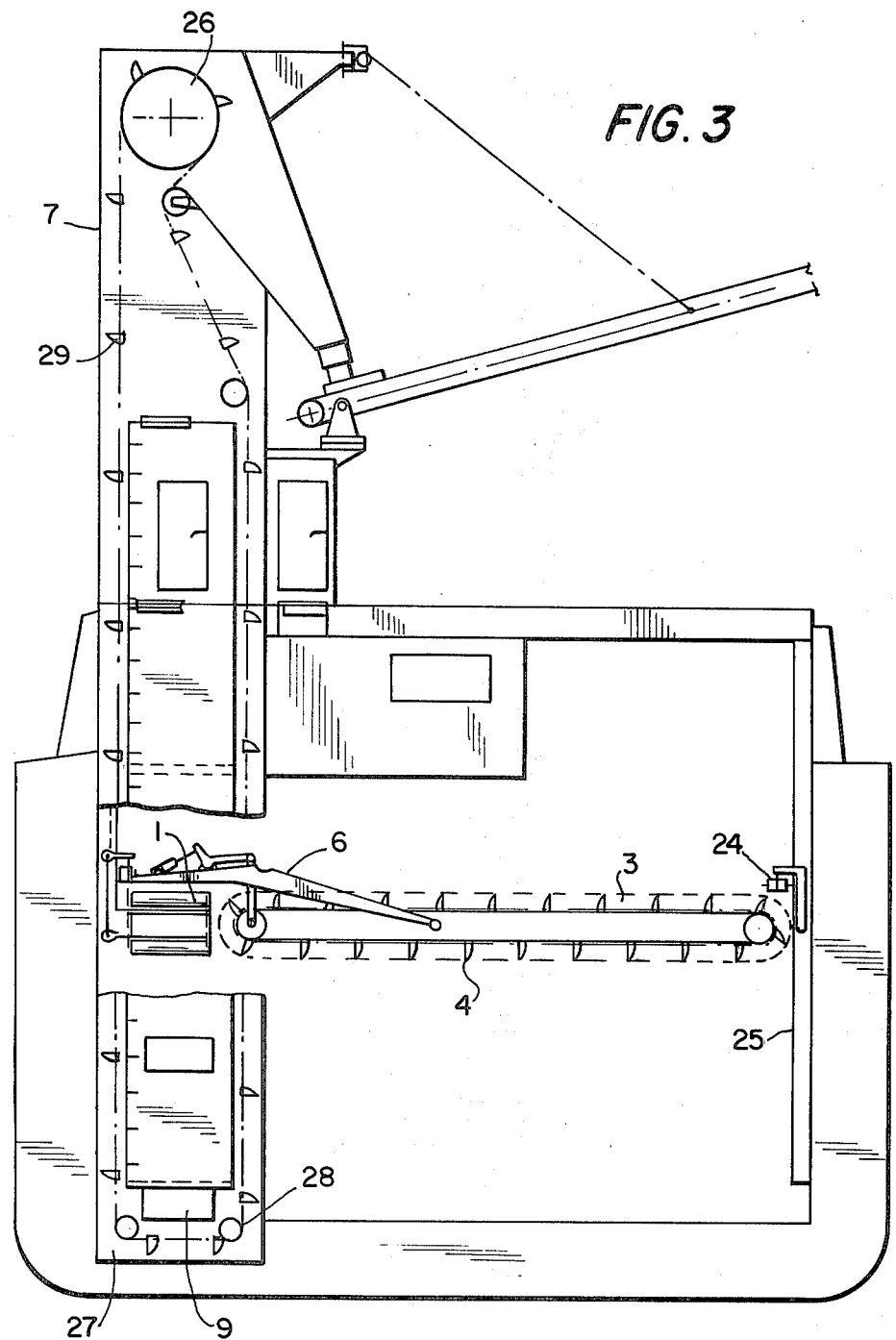
FIG. 3 is a vertical sectional view in the transverse direction of the ship.

The main scraper member 1 delivers an bulk material to the elevator 7 as shown in FIGS. 1 and 3. The elevator 7 is in the form of a bucket elevator with endless chains running over a driving shaft 26 and guiding shafts 27, 28, and between the chains are fastened lifting buckets 29. In the construction shown in FIG. 3 the elevator equipment extends down to the bottom or ground floor and is installed in a permanent shaft or the like. The main scraper member 1 is placed opposite one wall of the hull and moves the material parallel with and along the wall. The bulk material is thus delivered into the elevator in a direction parallel with the elevator's driving and guiding shafts 26, 27 and 28, but transverse of the the direction of movement of the endless chains holding the buckets, through specially designed openings 8, covered with flaps which may be remote-controlled. The bucket conveyor itself thus moves within a limited room with permanent walls, in which the openings 9 are situated. This room will give space for manual service work and control of the equipment. The bulk material is partly pushed and partly falls inside and into the lifting buckets. Due to the relatively short scraping movement performed by the buckets in the shaft's lower room 9 in a direction transverse to the direction of the supply, the conveyor buckets will first transport the bulk material in a substantially horizontal direction, before it is lifted vertically. This secures an effective filling of each elevator bucket. The elevator conveys the bulk material by free fall or throw-off to a suitable receiving equipment.

The provision of one integrated, vertically movable scraper conveyor running along rails mounted opposite one wall of a room is not only space-saving, but is also a constructionally simpler, cheaper and more reliable solution, giving cargo storage hulls or rooms which are more versatile than before. Rail transport, with the use of rotating wheels gives low friction and is less force-, energy- and maintenance-demanding than transport using sliding parts securely fixed in relation to each other. The rails are easy to mount even against an uneven surface, where simple linings or supports can be used. Furthermore, the electrical connections to the driving means and the other electrical installations necessary to operate the unloading gear are also substantially simplified.

I claim:

1. An apparatus for unloading bulk material from a storage area such as a storage room, a cargo hull and the like by attacking the bulk material from above, said apparatus comprising:

a main scraper conveyor member mounted at a position adjacent one wall of the storage area and operable for scraping the bulk material horizontally along such one wall in a longitudinal direction toward a discharge area;

first means mounting said main scraper conveyor member for vertical movement at said position adjacent such one wall;

a transverse scraper conveyor member, supported by said main scraper conveyor member, for scraping the bulk material horizontally in a transverse direction toward said main scraper conveyor member; and second means mounting said transverse scraper conveyor member on said main scraper conveyor member for vertical movement therewith and for movement therealong back and forth in said longitudinal direction.

2. An apparatus as claimed in claim 1, further comprising an elevator mounted at said discharge area for receiving the bulk material from said main scraper conveyor and for transporting such bulk material vertically from the storage area.

3. An apparatus as claimed in claim 1, wherein said first mounting means comprises at least two vertical rails mounted on the one wall, and at least two sets of wheels on said main scraper conveyor member and guided along respective said rails.

4. An apparatus as claimed in claim 1, wherein said second mounting means comprises a longitudinal guide on said main scraper conveyor member, and a fork member movably mounted in said longitudinal guide and integrally supporting a first end of said transverse scraper conveyor member.

5. An apparatus as claimed in claim 4, wherein said fork member is vertically adjustable.

6. An apparatus as claimed in claim 4, further comprising a horizontal guide slidably fastened to a second end of said transverse scraper conveyor member, vertical rails mounted on a wall opposite such one wall, and sets of wheels on said horizontal guide and guided along said vertical rails.

* * * * *